United States Patent
Sugavanam et al.

(10) Patent No.: US 10,493,365 B2
(45) Date of Patent: Dec. 3, 2019

(54) SYSTEM AND METHOD FOR PLAYING A PREDICTIVE SPORTS GAME ON A COMPUTING DEVICE

(71) Applicant: Fanisko LLC, Aurora, IL (US)

(72) Inventors: Prasanna Sugavanam, Collierville, TN (US); Aravind Sampath, Ashburn, VA (US); Sathish Chittibabu, Aurora, IL (US)

(73) Assignee: FANISKO LLC, Aurora, IL (US)

( * ) Notice: Subject to any disclaimer, the term of this patent is extended or adjusted under 35 U.S.C. 154(b) by 515 days.

(21) Appl. No.: 15/215,497

(22) Filed: Jul. 20, 2016

(65) Prior Publication Data

US 2017/0021280 A1   Jan. 26, 2017

Related U.S. Application Data

(60) Provisional application No. 62/195,022, filed on Jul. 21, 2015.

(51) Int. Cl.

| | | |
|---|---|---|
| *A63F 13/00* | (2014.01) | |
| *A63F 13/828* | (2014.01) | |
| *A63F 13/20* | (2014.01) | |
| *G07F 17/32* | (2006.01) | |
| *A63F 13/335* | (2014.01) | |
| *A63F 13/35* | (2014.01) | |
| *A63F 13/25* | (2014.01) | |
| *A63F 13/21* | (2014.01) | |

(52) U.S. Cl.
CPC ............ *A63F 13/828* (2014.09); *A63F 13/20* (2014.09); *A63F 13/21* (2014.09); *A63F 13/25* (2014.09); *A63F 13/335* (2014.09); *A63F 13/35* (2014.09); *G07F 17/3244* (2013.01); *A63F 2300/53* (2013.01)

(58) Field of Classification Search
None
See application file for complete search history.

(56) References Cited

U.S. PATENT DOCUMENTS

| 6,293,868 | B1 * | 9/2001 | Bernard | A63F 3/081 |
| | | | | 463/4 |
| 7,774,155 | B2 * | 8/2010 | Sato | A63F 13/06 |
| | | | | 702/127 |
| 8,758,111 | B2 * | 6/2014 | Lutnick | G07F 17/3276 |
| | | | | 273/292 |
| 2003/0040349 | A1 * | 2/2003 | Imaeda | A63F 13/06 |
| | | | | 463/3 |
| 2006/0128468 | A1 * | 6/2006 | Yoshikawa | A63F 13/10 |
| | | | | 463/36 |
| 2006/0189372 | A1 * | 8/2006 | Westrup | G06Q 30/02 |
| | | | | 463/17 |

(Continued)

*Primary Examiner* — Paul A D'Agostino
(74) *Attorney, Agent, or Firm* — McDermott Will & Emery LLP

(57) ABSTRACT

A prediction gaming system is disclosed. The system allows users to predict live scores on a mobile platform ball-by-ball in a Cricket game before the ball is bowled while the game is in progress. There is a user interface (UI), a fast live score feed methodology, user prediction capture, reconciliation and reward framework. The methods and systems described here are further applicable to other sports including tennis, where the methods are applicable point-by-point and in baseball, applicable pitch-by-pitch.

9 Claims, 9 Drawing Sheets

(56) References Cited

U.S. PATENT DOCUMENTS

| | | | | |
|---|---|---|---|---|
| 2009/0262137 | A1* | 10/2009 | Walker | H04H 60/04 |
| | | | | 345/629 |
| 2012/0046094 | A1* | 2/2012 | Shore | G07F 17/3288 |
| | | | | 463/25 |
| 2012/0046095 | A1* | 2/2012 | Shore | G07F 17/3244 |
| | | | | 463/25 |
| 2013/0267328 | A1* | 10/2013 | Heisler | G06Q 30/02 |
| | | | | 463/42 |
| 2014/0031703 | A1* | 1/2014 | Rayner | A61B 5/02055 |
| | | | | 600/484 |
| 2014/0228649 | A1* | 8/2014 | Rayner | A61B 5/1118 |
| | | | | 600/301 |
| 2014/0347265 | A1* | 11/2014 | Aimone | G09G 3/003 |
| | | | | 345/156 |
| 2014/0365412 | A1* | 12/2014 | Mizrachi | G06N 20/00 |
| | | | | 706/14 |

* cited by examiner

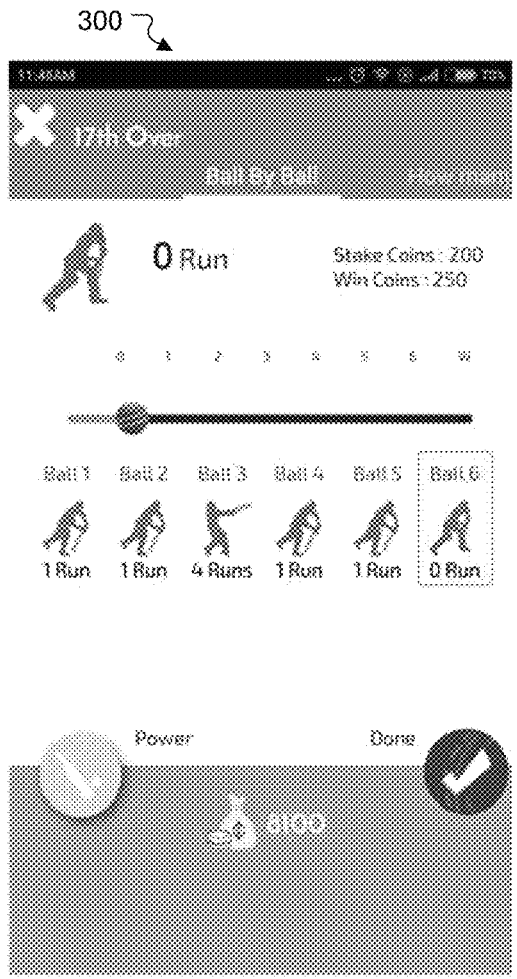
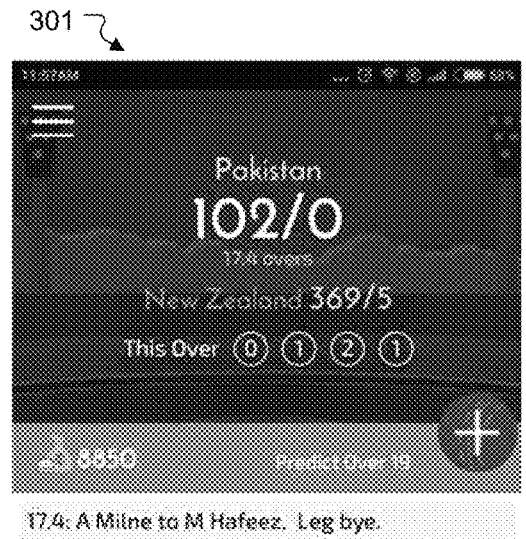
FIG. 3A FIG. 3B

SYSTEM AND METHOD FOR PLAYING A PREDICTIVE SPORTS GAME ON A COMPUTING DEVICE

CROSS-REFERENCE TO RELATED APPLICATION

This application claims the benefit of U.S. Provisional Application No. 62/195,022, entitled "SYSTEM AND METHOD FOR PLAYING A PREDICTIVE SPORTS GAME ON A COMPUTING DEVICE," filed Jul. 21, 2015, the entirety of which is incorporated herein by reference.

TECHNICAL FIELD

The present description relates in general to simulating aspects of a predictive game, and more particularly to, for example, without limitation, a system and method for playing a predictive sports game on a computing device.

BACKGROUND

Fantasy sports are very popular. Traditional fantasy sports involve users creating fantasy teams, either online or on a mobile platform, that are populated with players from actual sporting events. The performance of the fantasy team is based on the performance of the players in the actual sporting event. A user would manage his roster for the entire season. In an alternative fantasy sports game, daily fantasy sports, the user may choose players for one days' slate of games. Teams and points are reset the next day. These fantasy sports models do not require live scores to update simultaneously across access platforms. Prediction or roster creation, reconciliation, and award evaluation are typically done on the server side. These components are non-critical from a quality of service perspective. This type of a fantasy model is an "offline" model.

With fantasy entertainment becoming more popular across the globe, social media's integration into sports everywhere, advancements in internet speeds on mobile devices, mobile devices' computational capabilities, and services that provide business-to-business sports scores near real-time, there is room for fantasy sports gaming system that is "online" (predicting the results before the actual outcome near real-time). This also requires the gaming system to update scores, capture predictions, evaluate, reconcile and reward near-real time for all users.

The description provided in the background section should not be assumed to be prior art merely because it is mentioned in or associated with the background section. The background section may include information that describes one or more aspects of the subject technology.

SUMMARY

Aspects of the subject technology relate to a method. The method includes receiving sensor data on a motion of one or more sensors of a device. The method further includes determining a performance evaluation based on the received sensor data. The method also includes awarding credits based on the performance evaluation.

Aspects of the subject technology also relate to a non-transitory machine-readable medium including instructions stored therein, which when executed by a machine, cause the machine to perform operations. The operations include activating a sensor listener interface for the one or more sensors, determining a periodic interval value, and requesting sensor data after the periodic interval value elapses. The operations further include receiving the sensor data on a motion of one or more sensors of a device, determining a performance evaluation based on the received sensor data, and awarding credits based on the performance evaluation.

Aspects of the subject technology also relate to a system. The system includes one or more processors and a non-transitory computer-readable medium comprising instructions stored therein, which, when executed by the one or more processors, cause the one or more processors to perform operations. The operations include receiving a selection of an available game, receiving a prediction associated with the selected available game, and receiving a number of credits associated with the prediction. The operations further include receiving results of the selected available game, evaluating the prediction with the received results, and awarding credits based on the evaluation.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIGS. 3A and 3B show user interface (UI) screens, according to aspects.

Figure 1:
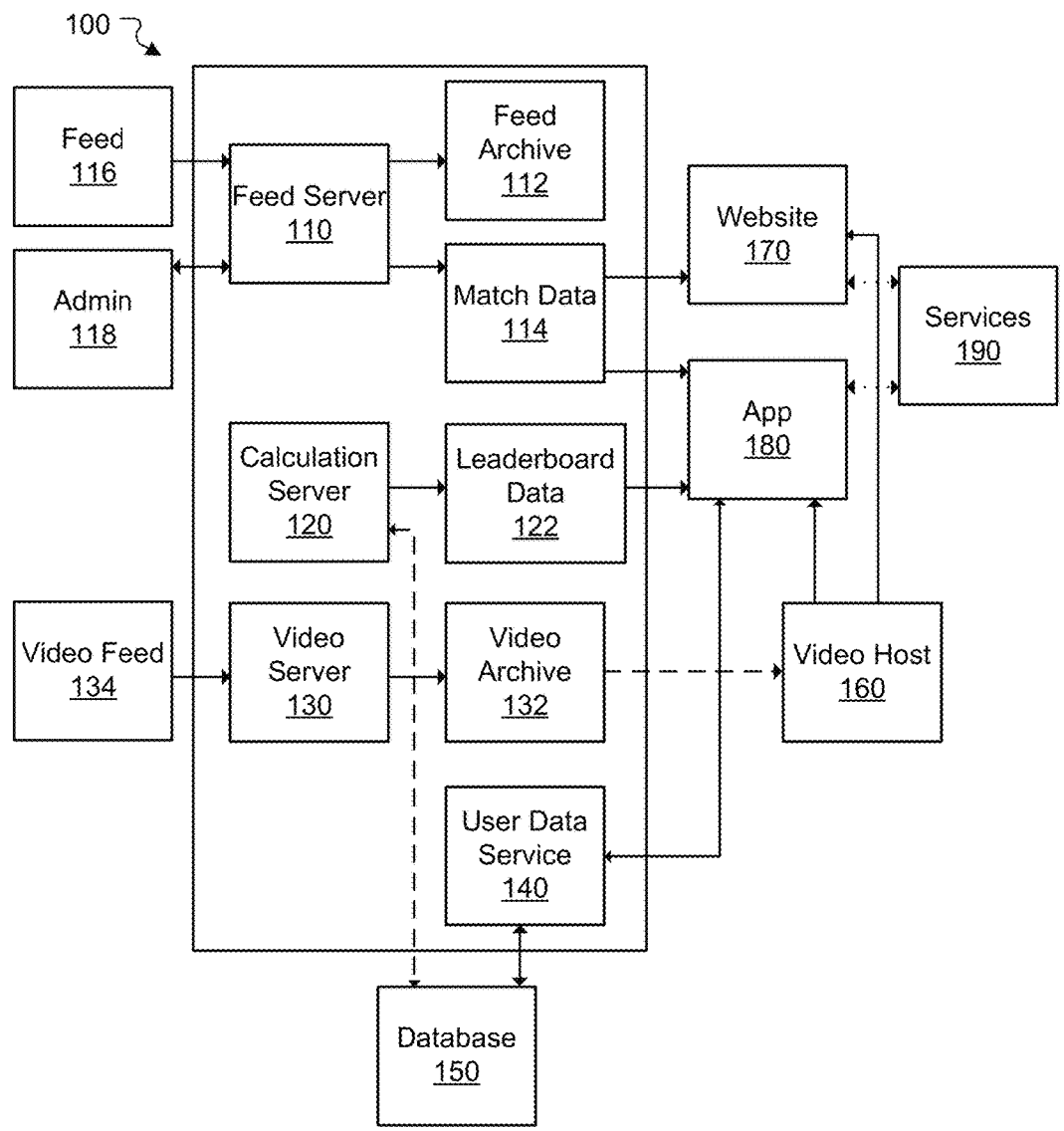
FIG. 1 illustrates a schematic diagram of a predictive sports game system, according to aspects.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Although the present disclosure describes a predictive sports game for cricket, other sports games, events, etc. may form the basis for users to make predictions. Sports games or other live events having discrete quantifiable events may for the bases for users to make predictions. For example, a tennis match is dividable into games and sets, baseball is dividable into innings and outs, soccer is dividable into two periods, etc. Users may predict the scores for these discrete events.

Aspects of the subject technology include updating live scores across multiple mobile devices at the same time. This insures that all users have the information at the same time to make their predictions appropriately. For example, if a player is out and a new player is in batting, the user prediction may vary largely based on this information. By distributing the scores simultaneously across all of the mobile devices, every user has the same information at the same time.

Aspects of the subject technology include capturing user predictions and comparing to actual results on the mobile devices. Specifically, the design involves client side storage of the predictions as long as the user remains in the prediction screen. This may minimize the number of writes/reads to/from the database, decreases latency, improves bandwidth, and minimizes processor stalling because there is no wait in memory based operations.

Aspects of the subject technology include reconciling predictions, results and points or credits awarded. User outcome prediction of a specific ball is compared with the actual outcome in the live match from the feed. The comparison results in points earned or lost depending on if the prediction is correct or incorrect. This comparison and award procedure is executed for each ball. At the end of the over, totals for the over are calculated—total runs scored, number of fours, number of sixes and number of wickets. If the user has totals predicted for the over, they are compared and points are won/lost. This information is then written back to the database at the end of each over including other critical parameters like network operator, time of prediction, over of prediction etc.

FIG. 1 provides an architectural overview of the predictive sports game system associated with live sports games, according to aspects. The description below is intended to capture and convey the significant architectural decisions that have been made on the system. The predictive sports game is based on cloud computing, meaning the application resources are delivered and paid depending on the demand/usage. The advantages of cloud computing include providing a simple way to access servers, storage, databases and other application services over the internet.

Feed 116, which may be an XML feed, includes live scores for a match is received from a vendor, such as a sports league or affiliate, and is parsed by a feed server 110 and backed up in a feed archive 112, which may be a database. A chat bot runs on the feed server 110 in a way to automate many operations-related tasks and for monitoring the system health, which may interface with an admin 118 corresponding to an administrator or administrative server. The feed server 110 parses match data 114 for sending to a website 170 or an app 180. The website 170 may be a website or web application accessible by computing devices. The app 180 may be an app which runs on mobile devices. The match data 114 may include live score updates, text commentary, match results, and fixtures.

The app 180 communicates with the user data service 140, which analyzes user data, such as user predictions and results, public social profile information, analytics, etc., which are stored in a database 150. A calculation server 120 calculates leaderboard data 122, which may include daily, weekly, and overall leaderboard data, based on user data from the database 150. The leaderboard data 122 is sent to the app 180 for display and may also be stored in the database 150.

A video server 130 receives a video feed 134 from the vendor, which is backed up in a video archive 132, which may be a database. The video feed 134 may be published on a video host 160, which may be a private video host. The website 170 and/or the app 180 may be able to display the video feed 134 through the video host 160.

Service 190 may include various web services, such as advertisement services, analytics services, mobile ad services, etc., which communicate with the website 170 and/or the app 180 for analysis.

Figure 2:
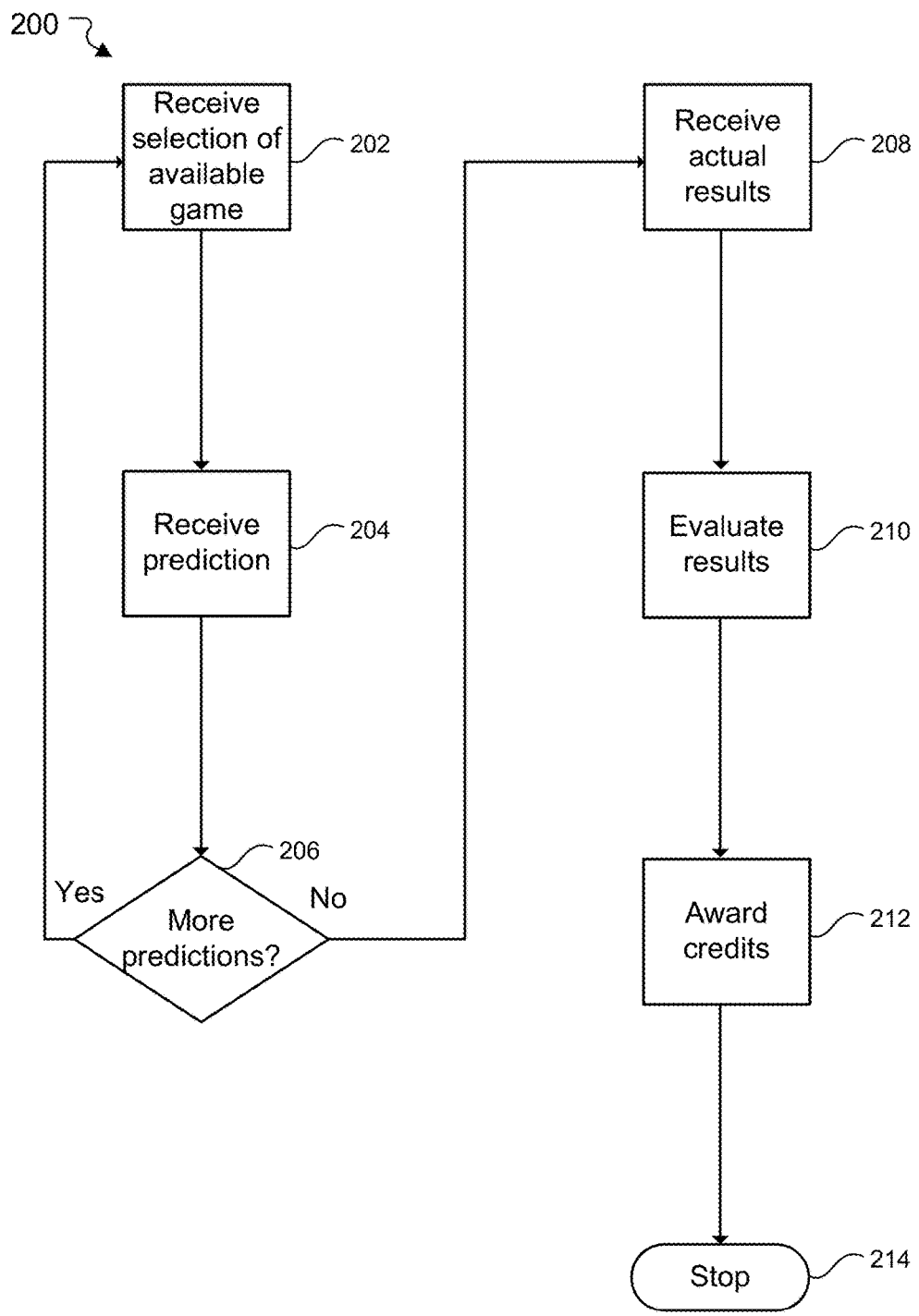
FIG. 2 shows a flowchart of a predictive sports game, according to aspects.

FIG. 2 illustrates a flowchart 200 for a process of a predictive cricket game, according to aspects. The user may, for example, may launch an app on his mobile device or other computing device to start the predictive cricket game. At block 202, the computing device receives a selection of an available game. The user may be presented a menu of available games, such as in a pulldown list, from which the user may select with an appropriate input, such as touching a touchscreen. Available games may include cricket games which are currently in progress. The games in progress may be limited to games which are not nearing completion. For example, the available games may include games in progress having at least a threshold number of overs remaining in the game. The available games may also include cricket games which have not yet started. The games not yet started may be limited to games which are scheduled to start within a threshold amount of time from the current time.

At block 204, the computing device receives a prediction. The user makes a prediction about the selected available game. The user may be presented an interface which allows making the prediction. For example, as seen in FIG. 3A, the screen 300 shows a prediction user interface according to aspects. The six falls for the over is shown, providing the user to select a ball and select how many runs, 0, 1, 2, 3, 4, 5, 6, or W (wicket), as well as how many credits (e.g. coins) are at stake, how many can be won, the credit pool at the bottom, a button for using a power (e.g. a bonus or multiplier), and a button for completing the prediction.

For example, the user may first select an available over from the selected available game. The available overs may be limited to overs which have not yet started, although in certain implementations an over in progress may be selected. The user may then make a prediction for each ball of the selected over. For example, the user may make a prediction of how many runs or a prediction of a wicket for each ball. Once the user makes predictions for all balls (e.g. six) in the selected over, the process continues.

In implementations, each prediction may require credits. For example, each over may require at least 1 credit for a prediction or each ball prediction may require at least 1 credit, such that each ball may have different numbers of credits at stake. The user has a cumulative credit pool to use. The user may initially start with a predetermined number of credits, for example 20 credits, when starting the predictive cricket game for the first time. As the user uses credits for making predictions, and earns credits, the user's credit total may change.

At block 206, the computing device determines whether there are more predictions. The user may be presented with an option to make further predictions, for example by selecting another available over, or to end predictions for the selected game. If the user indicates more prediction, the process returns to block 204. Otherwise, the process continues.

At block 208, the computing device receives the actual results from the selected game. The results may be received in real-time as the game progresses, similar to a live feed. Alternatively, the results may be received discretely, such as the results of each over after the over is completed. In certain implementations, the user may be provided the results for viewing. For example, the user may be presented a play-by-play breakdown of the selected game. The user may also be provided live audio and/or video from the selected game. The results may be displayed along with the user's predictions.

At block 210, the results are evaluated. The computing device compares the results to the user's predictions to determine which of the user's predictions were correct. At block 212, credits are awarded. Points may be assigned to various predictions based on the type of prediction and the outcome of the prediction. For example, the user may earn 1 point for correctly predicting 0 or 1 runs for a ball, 2 points for a correct prediction of 2 runs, 3 points for a correct prediction of 3 runs, 4 points for a correct prediction of 4 runs, 5 points for a correct prediction of 5 runs, 6 points for a correct prediction of 6 runs, and 10 points for a correct prediction of a wicket. The user is then awarded credits based on the points earned. The credits awarded may equal the points earned although in other implementations, other ratios of points to credits may be used, such as 10 points equaling 1 credit. In certain implementations, the user may be awarded additional credits for achieving milestones. For example, the user may be awarded bonus credits for correctly predicting an over or an innings. Table 1 below shows how credits may be awarded, according to aspects:

TABLE 1

| Prediction | Credits at stake | Award Credits | Points Scored |
|---|---|---|---|
| 0 runs | 200 | 250 | 1 |
| 1 run | 200 | 250 | 1 |
| 2 runs | 200 | 400 | 2 |
| 3 runs | 300 | 900 | 3 |
| 4 runs | 200 | 400 | 4 |
| 5 runs | 500 | 1500 | 5 |
| 6 runs | 500 | 2000 | 6 |
| Wicket | 1000 | 4000 | 10 |
| Total runs in an over | 500 | 1500 | Number of runs |
| Total 4 s | 300 | 600 | 4 points for each 4 predicted |
| Total 6 s | 300 | 600 | 6 points for each 6 predicted |
| Total wickets | 300 | 600 | 10 points for each wicket predicted |

The user may then be presented with the results and be displayed his updated credits amount. FIG. 3B shows a sample screen 301 of results. The top half may include the scores for each team, and the results of the overs.

The evaluation of results and awarding of credits may happen in real-time, such that after each ball result is received, the corresponding prediction is evaluated and the user is awarded credits. Alternatively, the evaluation of results and awarding of credits may happen at discrete events, such as after an over or after an innings, or after the game ends. In certain implementations, the evaluation of results and awarding of credits may occur when the user checks his results.

Figure 4A:
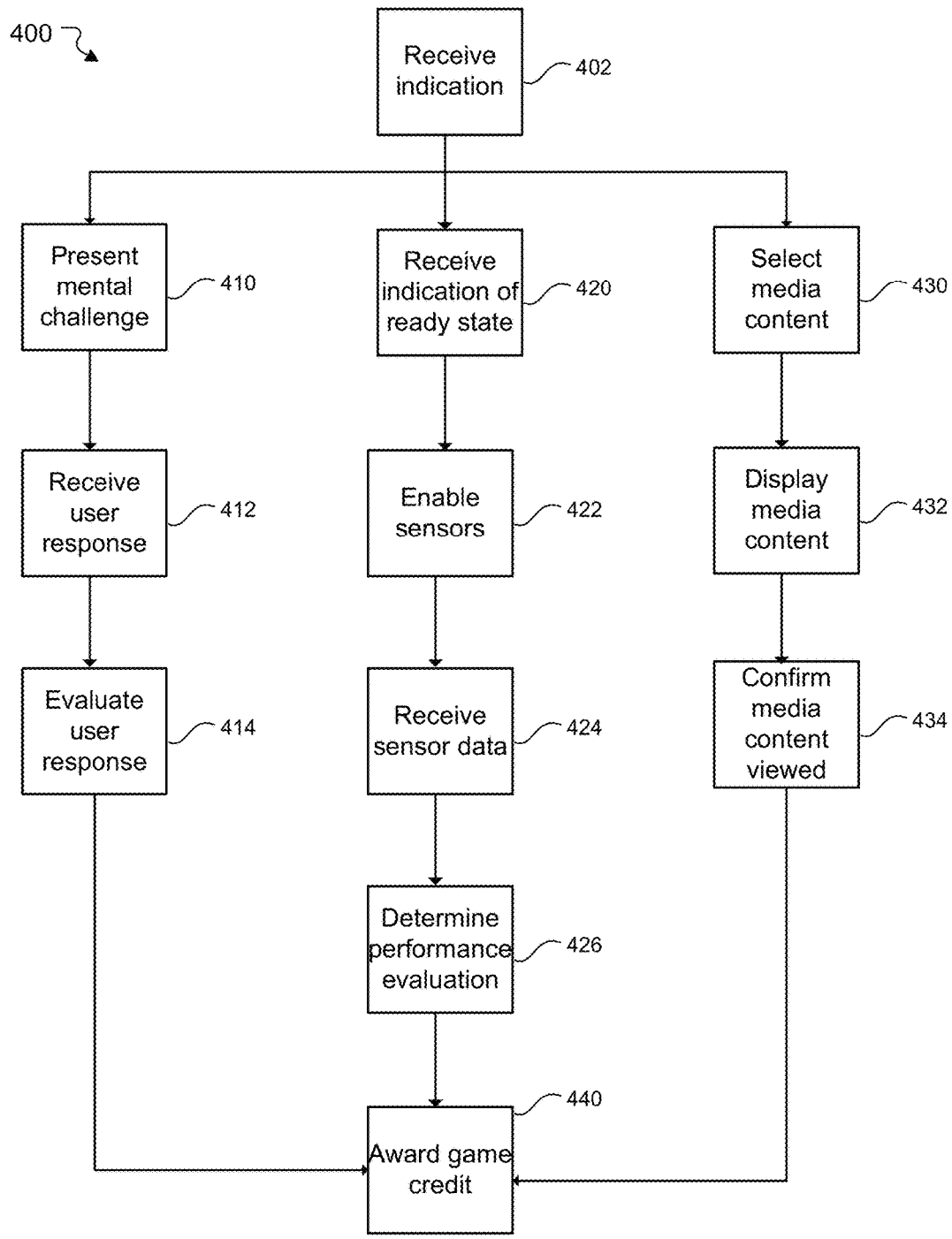
FIG. 4A shows a flowchart of credit accumulation modes, according to aspects.

FIG. 4A illustrates a flowchart 400 for a process of accumulating game credit, according to aspects. At block 402, the computing device receives an indication from the user to start a credit accumulation mode. While playing the predictive cricket game, the user may desire more credits. For example, the user may have used his available credits, or may otherwise not have enough credits to predict all the cricket games and/or overs the user would like. Within the predictive cricket game, the user may be presented an option to start the credit accumulation mode for the user to earn additional credits.

The indication may further include an indication regarding which of at least three types of credit accumulation modes the user has selected. For example, the user may be able to select between a mental type, a physical type, and a passive type. The mental type may provide mental challenges to the user for earning credits, such as a trivia game. The physical type may provide a physical challenge to the user, such as simulating bat swings. The passive type may provide a passive way for the user to earn credits, such as viewing a video.

If the user has indicated the mental type, the process continues to 410. The mental type of accumulation mode is a way for the user to earn credits by demonstrating mental acumen regarding the game of cricket.

Trivia is available for users to test their knowledge in cricket and earn credits at the same time to use in the application. A total of ten questions generated at random from a pool of questions must be answered in 60 seconds. Each correct answer is worth, for example, a hundred points. A pool of trivia questions, answer choices and the correct answer are preloaded in a database. Users are eligible to answer trivia questions as many times as they want as long as all of the questions are not exhausted as the questions are not repeated each time. Feedback to user's selection is provided immediately as well as coins earned.

At block 410, the computing device presents a mental challenge. The mental challenge may be in the form of a multiple-choice question. The multiple-choice question may be a trivia question, such as trivia on cricket history, cricket terms, cricket strategy, current statistics, etc. Alternatively, the mental challenge may be in other forms, such as a question requiring a short answer, a fill-in-the-blank question, a matching question, a sound to be identified, a diagram requiring identification of elements in the diagram or scenarios presented by the diagram, or other types of puzzles.

The mental challenge may be associated with a difficulty level. The difficulty level may be user selectable, such as allowing the user to select easy, medium, or hard, or may be associated with the questions themselves such that the user may receive a random difficulty.

At block 412, the computing device receives the user response. The user may input his answer on the computing device, such as through a touchscreen or other input device. In certain implementations, the user may have a restricted to a threshold amount of time in which to respond. If the threshold amount of time lapses, the user response may be an automatic or default response, such as a non-answer.

At block 414, the computing device evaluates the user response. The user response is compared against the correct response to the mental challenge. For example, if the mental challenge was a multiple-choice question, the user response is compared to the correct choice. For certain mental challenges, there may be more than one correct response, or there may be partially correct responses.

The user may be scored points based on his response. The points may be determined by whether the user response was the correct response or a partially correct response. In certain implementations, additional factors may influence the points. For example, bonus points may be awarded based on difficulty, or speed of response.

Blocks 410-414 may be repeated for each mental challenge presented to the user. The user may be allowed to solve more than one mental challenge. For instance, the user may be allowed to solve successive mental challenges until the user indicates quitting. Alternatively, the user may be presented with a certain number of mental challenges in a session.

At block 440, the computing device awards game credits. The credits are awarded based on the points accumulated during the accumulation mode. The credits awarded may equal the points earned although in other implementations, other ratios of points to credits may be used, such as 10 points equaling 1 credit.

If at block 402, the user indicated the passive type of accumulation mode, the process continues to block 430. At block 430, media content is selected, such as video from the video host 160, or text/graphics from an ad server. The video may be an ad video. At block 432, the media content is displayed, such as through the website 170 or the app 180. At block 434, confirmation that the media content was viewed is provided. In response to the confirmation, at block 440 credits are awarded. A predetermined number of credits may be rewarded for each viewed media content, or may vary based on the type of media content viewed.

If at block 402, the user indicated the physical type of accumulation mode, the process continues to block 420. The physical accumulation mode corresponds to the user swinging his mobile device to swing at a virtual delivery. The virtual delivery may be a starting event for determining when to record sensor data. Based on how well the user swings, the user is awarded credits.

Figure 5:
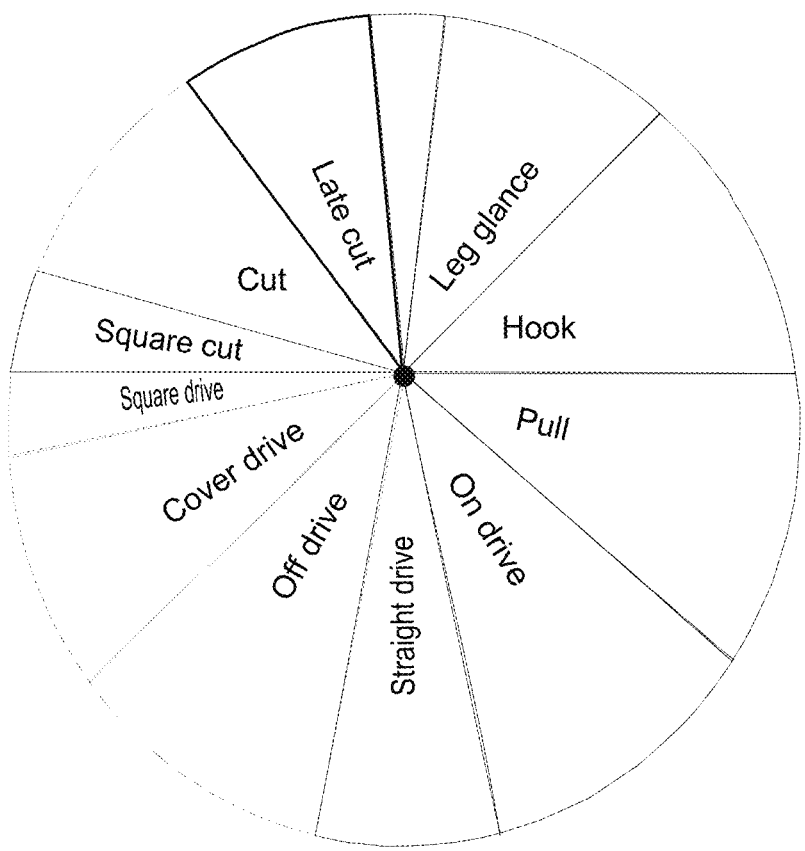
FIG. 5 shows a diagram of cricket shots, according to aspects.

A predict button is made available in UI at the center of the screen with the available credits and over number for prediction. The over available for prediction depends on the over in progress in the actual live game. For example, if over number five is in progress, overs six through ten are available for prediction. The prediction user interface is shown in FIG. 5. For every ball, an outcome of runs between zero through six can be chosen or a wicket. A sliding bar is used for the selection for each ball. Optionally, bonuses may be enabled, if available, for prediction if there are enough credits required to activate them. The number of credits earned or lost would depend on whether or not bonuses are used in predicting the over.

At block 420, an indication of a ready state is received. For example, the user taps a button right before starting a swing.

At block 422, sensors are enabled. For example, a sensor listener interface on a mobile device is activated. A parameter is determined for a periodic interval value such that sensor data is requested periodically after the periodic interval value elapses. The periodic interval value corresponds to a frequency at which the sensors are polled during the swing. The periodic interval value may be 20 milliseconds or another appropriate value. The sensors activated may include an accelerometer and a gyroscope.

At block 424, sensor data is received. The sensor data may be received periodically. At the beginning of the play, the initial orientation of the device is stored. Then, the change in direction is measured along the axes over time. The rotation matrices are multiplied together and thus the rotation is integrated over time. The change matrices can be multiplied to the last known orientation of the device and that results in the final orientation of the device at any specific time. In certain implementations, 100 rotations per second may be measured.

At block 426, a performance evaluation is determined. In implementations, the accelerometer is used to measure the speed of the swing. If the speed is within one of a plurality of ranges, a predetermined number of runs associated with each range is scored. For example, if the speed is between a range of 12 and 17 on the accelerometer, 6 runs is scored, if speed is greater than or equal to 17 a four is scored. Table 2 below shows how credits may be awarded, according to aspects:

TABLE 2

| Shot Execution | Runs | Credits Earned |
| --- | --- | --- |
| >12 and <17 | 6 | 200 |
| >17 | 4 | 200 |
| 8 | 1 | 50 |
| 9 | 1 | 50 |
| 10 | 2 | 100 |
| 11 | 3 | 150 |
| 12 | 4 | 200 |

Additionally, a more complex model is implemented with the use of a gyroscope sensor in conjunction with the accelerometer. The gyroscope sensors provide the directional context of the type of shot that is played. It provides values that specify the rate of rotation around the X-axis, Y-axis and the Z-axis. Whether the shot is played on the off side, on side, behind the wickets, down the ground, up and over etc., can be determined. With this information as well as the accelerometer, the quality of the shot can be determined and runs assigned appropriately based on a predetermined ball profile. The runs, in turn, are converted to credits to be used in the predictive sports game described above.

The gyroscope's coordinate system may be the same as that for the accelerometer sensor. The output of the gyroscope is captured and is integrated over time to calculate rotation and change of angles over the time step. The final angle and quality of the shot is determined at the simulated point of the ball reaching the batsman's crease, this time is determined based on the ball profile. The virtual ball has to travel a fixed distance before the batsman can make contact with the ball. The angle and speed of the bat then determines the outcome.

A cricket playing ground is typically circular in shape. Assuming X to be the horizontal axis and Y to be the vertical axis, the cricket shots can be defined in terms of the angle between X and Y. Angles that make up the various cricket shots are predetermined. The angles are a factor in determination of the result. This represents shot selection. A ball on the off stump is difficult to be hit in the fine leg area without the batsman adjusting significantly. To simulate the shots, a fixed range is given for the angles of the axes for each type of shot. Accordingly, the probability of success is categorized as high, medium and low in the shot selection process for each of the predetermined ball profiles. FIG. 5 shows the types of shots based on the angle of the bat, if the batsman were in the center of the circle facing down (e.g. the 6 o'clock direction).

The Z axis (representing upward/downward motion) may be ignored in this framework because the outcome of the shot is determined by the linear acceleration, timing and direction of the shot as detailed below.

A constant one second delay is given for the user to prepare before the swing action is started from the time of selecting "play" in the application. For example, the ball may reach the batsman's crease at approximately 0.476 seconds after leaving the bowler's hand. To simulate real cricket, adjusting for playing on either the front foot or the back foot, the user is given an interval of 0.10 seconds (between 0.45 and 0.55 seconds) for the play. The direction at the point of maximum linear acceleration during this interval is evaluated for the result. This represents shot execution—timing and bat speed.

During shot selection, a numeric value is awarded for playing according to the merit of the ball. Probability of success categorized as high is assigned a value of 1, medium results in a value of 0.75 and low results in 0.5. This is multiplied with the linear acceleration measured at the set interval and that provides the final outcome. In other implementations, other multiplier values may be used, and more or less than 3 multipliers may be used.

In certain implementations, the maximum linear acceleration between the set intervals for the fast ball example above (95 mph, good length) is 12. It is also stated that the ball is bowled on the off-stump. The ball is bowled at a drivable length, there is high probability of success for such a shot. The shot is credited with four runs if the gyroscope points to a drive—straight drive to a square drive (12*1=12; table above shows 4 runs for a value of 12 for shot execution). Leg glance and a hook shot would have a low probability of success. That would result in zero runs credited to the user (12*0.5=6; no runs are awarded for a value less than 8). Any other type of shot would result in one run (12*0.75=9). In other implementations, other values may be used.

At block 440, credits are awarded. For example, based on the runs the user earned, a corresponding number of credits may be awarded. A predetermined number of credits, such as 50, may be awarded per run. Alternatively, each number of runs may be associated with a predetermined number of credits, such as 200 credits for 6 or 4 runs, 50 credits for 1 run, 100 credits for 2 runs, and 150 credits for 3 runs. Audio commentary, as described herein, may be used to deliver the live game results.

After the credits are awarded, the application unregisters the listeners so that the updates are no longer received.

In certain implementations, the over may be based on real-game data. For example, the virtual over may be based on a profile of a bowler, or may be based on a historical overs, or live game data. The deliveries may be displayed on the user's screen, such as with an animation or video of the ball. The delivery may affect the ranges of speed, as well as the angles shown in FIG. 5.

Figure 4B:
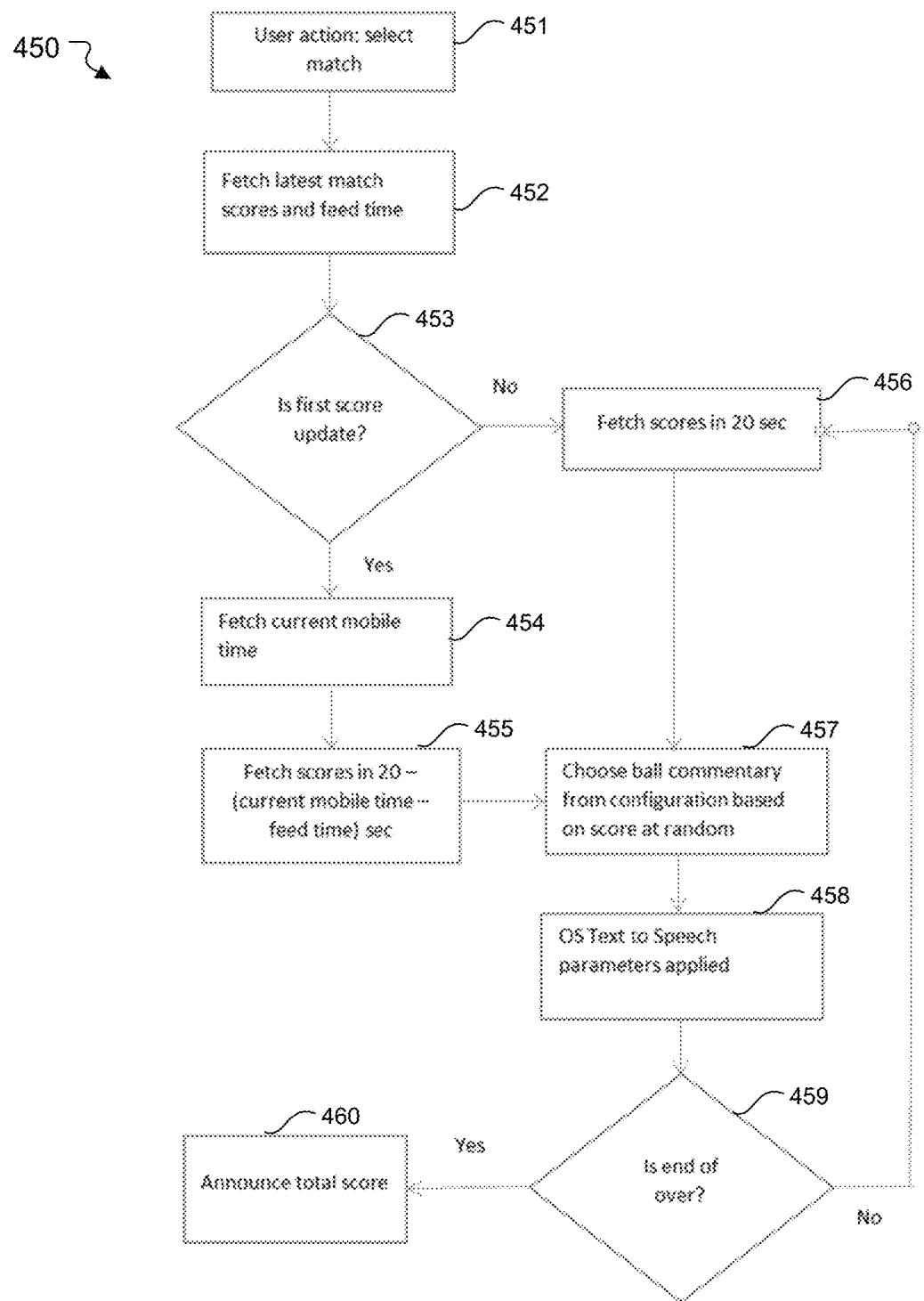
FIG. 4B shows a flowchart of providing live score updates, according to aspects.

FIG. 4B shows a flowchart 450 of a live score update feed with audio commentary, according to aspects. At block 451, the user selects a match.

At block 452, a list of matches is fed from the feed server 110. A series of information is queried and their responses are parsed, organized, and displayed on the application frond-end. The following information is requested from the server: Series, date, time, day, team names, internal match id, match status, isLive flag, and equation (who won or lost for completed games and the margin). The array list is converted to a JSON string before being sent to the viewer.

For the user selected match, the latest match scores and the UTC feed time from the server are fetched. At block 453, if the score update is the done for the first time after match selection, the next score is fetched in (20−(difference between the mobile time and the feed time)) seconds, at block 454 and block 455. This is to synchronize the mobile time and feed time such that the match score updates are fetched every twenty seconds.

Commentary module consists of a set of preset announcements for each possible outcome for a ball, one of which is chosen at random at block 457. For example, if the outcome of the ball is a zero (no runs scored), there are six commentaries stored. Operating system Text-to-Speech (TTS) service is invoked to announce scores and ball-by-ball commentary at block 458. For certain outcomes (e.g., a four or a wicket) crowd noise is played followed by the announcement of the score. This gives a radio/television-like ambience to the user enhancing user experience.

At block 459, if the end is over, the total score is announced at block 460. Otherwise, at block 456, the score is fetched and ball commentary repeated.

User interface controls are provided in the application to control sound and voice as well as push notifications. A toggle button is used to turn on or off. Sound service is turned off in the context of the application when in sound off setting. Also, sound services are stopped when music is played or when the user is speaking on the phone.

Figure 4C:
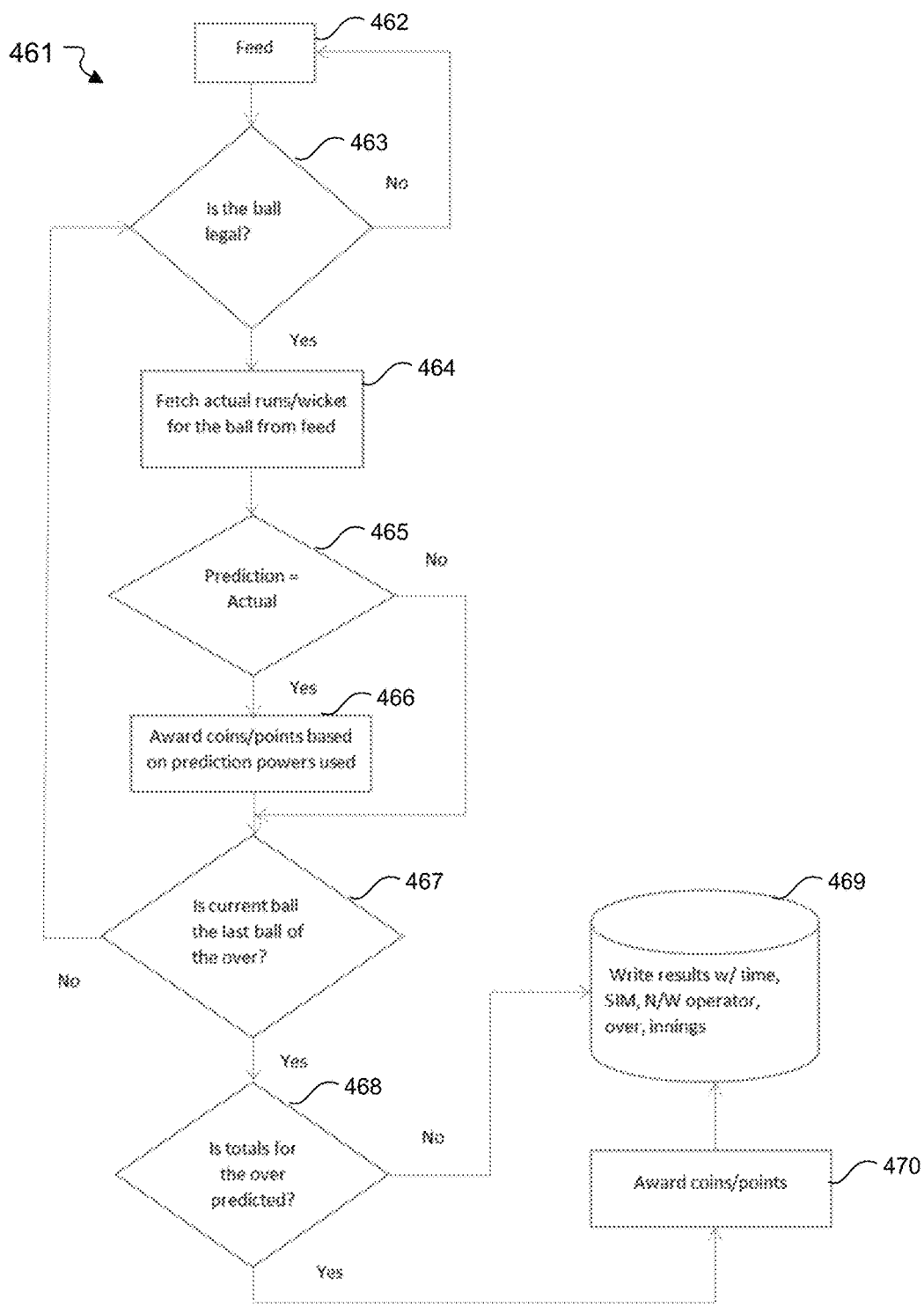
FIG. 4C shows another flowchart of a predictive sports game, according to aspects.

FIG. 4C shows a flowchart 461, of the predictive sports game, according to aspects. The user can predict results for each discrete event associated with the game, such as each of the six legal balls, total fours in an over, total sixes, wickets and total runs for the over. Bonuses may be applied for an over (2×, 3×, free-hit etc.) that will affect credits/points earned. The user may predict an over until the last ball of the previous over. The following over is closed for prediction at the last ball of the previous over.

At block 462, a feed for a current ball of an over is fetched for the live game. At block 463, the legality of the ball is determined. If the ball is a "run" ball, total runs scored is used in evaluation. If the ball is a "wicket" ball, the outcome is considered a wicket regardless of the runs that might have been scored in the delivery. Any extra runs scored on a legal ball such as "byes" and "leg-byes" are treated as runs and is taken for value. Other extras such as a "no ball" or "wide" are ignored as they not considered a legal ball.

At block 464, the actual runs or wicket for the ball is fetched from the feed. At block 465, the user's prediction is compared to the actual result. At 466, credits (e.g. coins) and/or points based on a correct prediction are awarded. Points may be awarded on a scale different from credits, and may be used to determine leaderboard rankings.

At block 467, if the current ball is not the last ball of the over the process returns to block 463. Otherwise, at block 468, if the totals for the over is predicted, then credits and/or points are awarded at block 470. At block 469, the results are saved.

Figure 6:
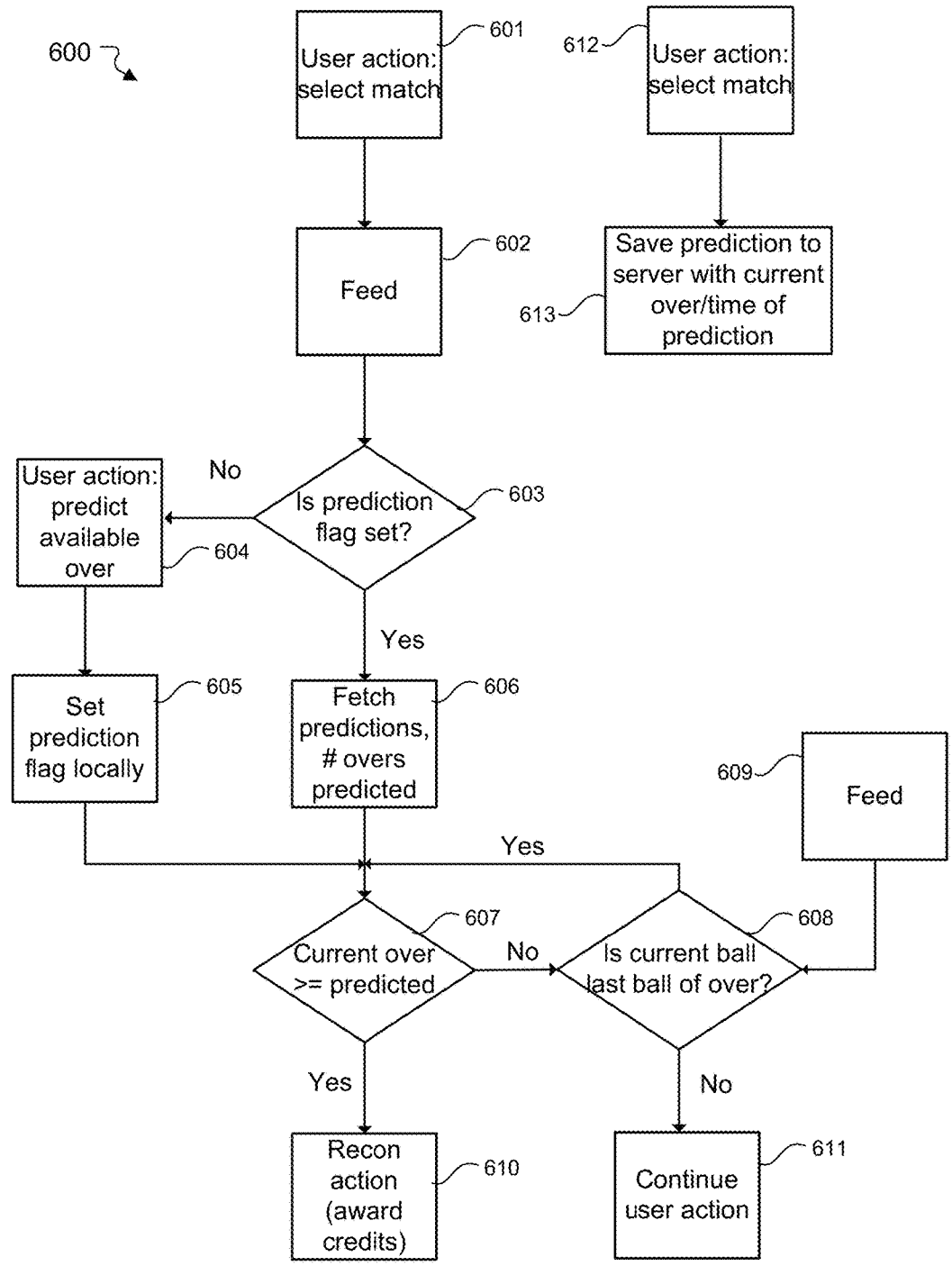
FIG. 6 shows a flowchart of a workflow, according to aspects.

FIG. 6 shows a flowchart 600 of a workflow, according to aspects.

When a user makes a live match selection at block 601, live feed for the match automatically starts flowing at block 602, as described above. Whether the prediction flag is set locally on the user's device is determined at block 603. If the prediction flag is not set, the user has not made a prediction. The prediction is made at block 604, as described above. After a prediction is made and saved, a prediction flag is set locally on the user's device along with the prediction details, at block 605. If the prediction flag was set at block 063, the predictions are fetched at block 606. At block 607, if the current over is greater than the predicted over (e.g. the predicted over has been bowled), then at block 610, recon action is taken to award credits based on the prediction, as described above. Otherwise, at block 608, if the current ball is the last ball of the over, the live feed is fetched at block 609. If not, the user action continues at block 611.

Prediction for an over is always done before the over is bowled in real life. Subsequently, as the over is bowled in the live cricket match, the actual results are compared to the prediction ball-by-ball. The ball is first evaluated if it is a legal delivery, as described above. If the prediction equals the actual outcome in the live match, credits/points are awarded depending on if bonuses are used. Rules for awarding credits/points are further described above. Credits are required to predict. Credits are deducted when a prediction is made depending on the outcome predicted and earned as correct predictions are made (also depending on the outcome predicted), whereas points are a result of correct prediction and ultimately used in leaderboard.

If the user exits the match after making predictions, at block 612, the predictions and other parameters related to predictions made including the over at the time of prediction, time, network class, operator, and SIM operator are written to the database at block 613.

User predictions are retrieved by sending a request to the database server. User predictions are stored with the user device id and match id as the primary keys. All of the user information are stored on the database.

Credits/Points are won based on the number of run(s)/wicket(s) correctly predicted. For example, probability of a dot ball is high in a cricket game as compared to the probability of a wicket outcome. Hence, a dot ball prediction may yield 250 credits and one point, whereas a correct wicket prediction may yield 4000 coins and ten points. Correct predictions made are shown on the summary screen and also can be viewed in a Prediction History screen in the application.

Figure 7:
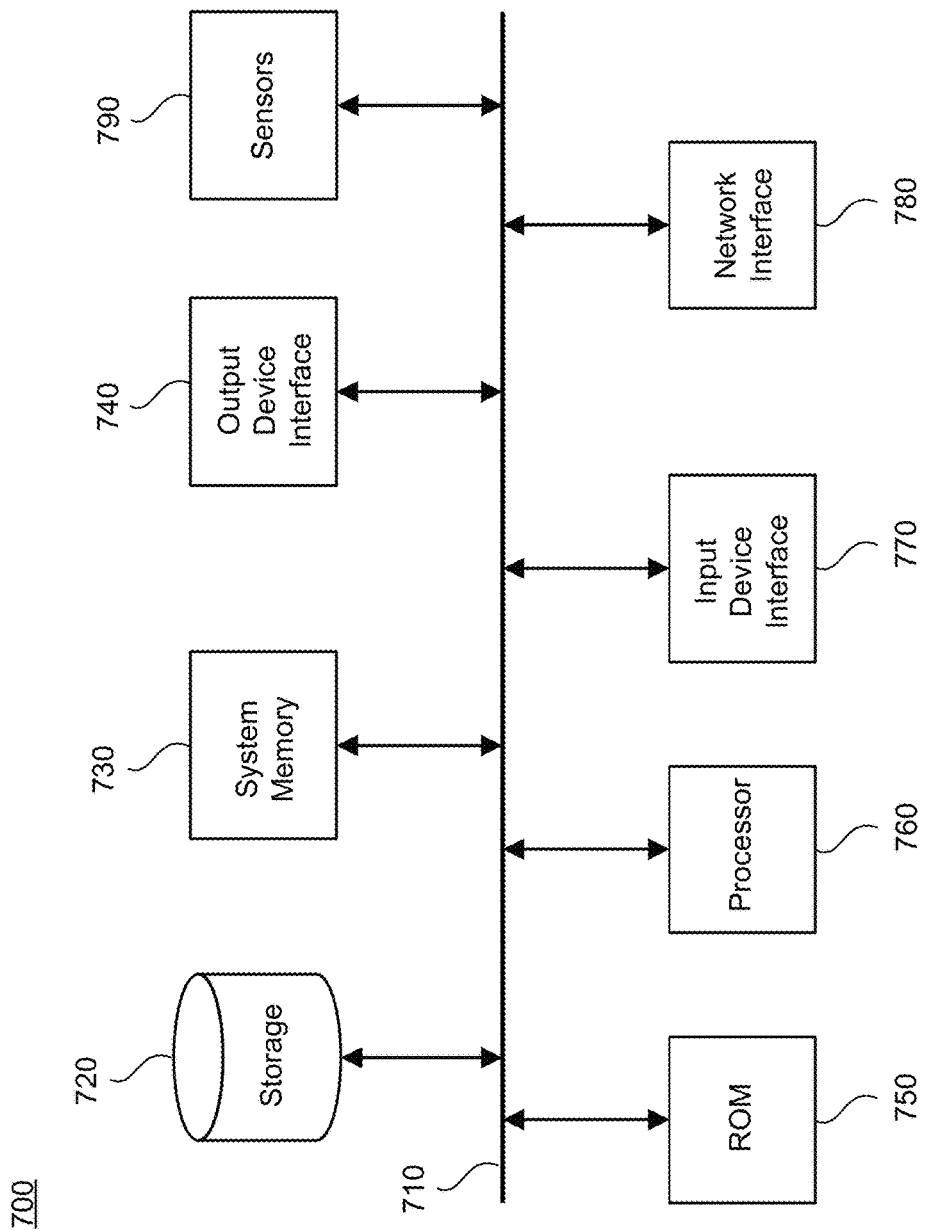
FIG. 7 shows a diagram of an electronic device, according to aspects.

FIG. 7 conceptually illustrates an example electronic system with which some implementations of the subject technology can be implemented. Electronic system 700 can be a computer, phone, PDA, or any other sort of electronic or mobile device. Such an electronic system includes various types of computer readable media and interfaces for various other types of computer readable media. Electronic system 700 includes a bus 710, processing unit(s) 760, a system memory 730, a read-only memory (ROM) 750, a permanent storage device 720, an input device interface 770, an output device interface 740, and a network interface 780.

Bus 710 collectively represents all system, peripheral, and chipset buses that communicatively connect the numerous internal devices of electronic system 700. For instance, bus 710 communicatively connects processing unit(s) 760 with ROM 750, system memory 730, and permanent storage device 720.

From these various memory units, processing unit(s) 760 retrieves instructions to execute and data to process in order to execute the processes of the subject disclosure. The processing unit(s) can be a single processor or a multi-core processor in different implementations.

ROM 750 stores static data and instructions that are needed by processing unit(s) 760 and other modules of the electronic system. Permanent storage device 720, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 720.

Other implementations use a removable storage device (for example, a floppy disk, flash drive, and its corresponding disk drive) as permanent storage device 720. Like permanent storage device 720, system memory 730 is a read-and-write memory device. However, unlike storage device 720, system memory 730 is a volatile read-and-write memory, such as a random access memory. System memory 730 stores some of the instructions and data that the processor needs at runtime. In some implementations, the processes of the subject disclosure are stored in system memory 730, permanent storage device 720, or ROM 750. For example, the various memory units include instructions for predictive sports game and/or credit accumulation modes. From these various memory units, processing unit(s) 760 retrieves instructions to execute and data to process in order to execute the processes of some implementations.

Bus 710 also connects to input and output device interfaces 770 and 740. Input device interface 770 enables the user to communicate information and select commands to the electronic system. Input devices used with input device interface 770 include, for example, alphanumeric keyboards and pointing devices (also called "cursor control devices"). Output device interfaces 740 enables, for example, the display of images generated by the electronic system 700. Output devices used with output device interface 740 include, for example, printers and display devices, for example, cathode ray tubes (CRT) or liquid crystal displays (LCD). Some implementations include devices, for example, a touchscreen that functions as both input and output devices.

As shown in FIG. 7, bus 710 also couples electronic system 700 to a network (not shown) through a network interface 780. In this manner, the computer can be a part of a network of computers (for example, a local area network (LAN), a wide area network (WAN), or an Intranet, or a network of networks, for example, the Internet. Any or all components of electronic system 700 can be used in conjunction with the subject disclosure.

Sensors 790 may include one or more sensors, such as accelerometers, gyroscopes, motion sensors, vibration sensors, optical sensors, and/or other sensors capable of detecting motion, position, and/or orientation of the electronic system 700.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system comprising:
   one or more processors; and
   a non-transitory computer-readable medium comprising instructions stored therein, which, when executed by the one or more processors, cause the one or more processors to perform operations comprising:
      presenting, using a graphical display of a computing device, a menu of available live sports games;
      receiving, via an input device of the computer device, a selection of an available game from the available live sports games;
      receiving a prediction for each of one or more discrete events associated with the selected available game;
      receiving a number of credits associated with the prediction;
      receiving live results for each of the one or more discrete events associated with the selected available game;
      evaluating the prediction with the received results;
      awarding credits based on the evaluation;
      receiving a request to enter a credit accumulation mode;
      activating a sensor listener interface for the one or more sensors;
      determining a periodic interval value indicating a frequency for which the sensor data is requested;
      requesting sensor data after each consecutive elapse of the periodic interval value until the motion ends;
      receiving the sensor data on a motion of one or more sensors of a device;
      determining a performance evaluation based on the received sensor data; and
      awarding credits based on the performance evaluation.

2. The system of claim 1, wherein awarding credits based on the evaluation includes:
   awarding credits in an amount equal to a first multiple of the number of credits for a first prediction type, or awarding credits in an amount equal to a second multiple of the number of credits greater than the first multiple for a second prediction type.

3. The system of claim 1, wherein the prediction is a first prediction for a first discrete event of the one or more discrete events, the operations further comprising:
- receiving a second prediction for a second discrete event of the one or more discrete events;
- evaluating the second prediction; and
- awarding credits based on the evaluation of the second prediction.

4. A method comprising:
- presenting, using a graphical display of a computing device, a menu of available live sports games;
- receiving, via an input device of the computer device, a selection of an available game from the available live sports games;
- receiving a prediction for each of one or more discrete events associated with the selected available game;
- receiving a number of credits associated with the prediction;
- receiving live results for each of the one or more discrete events associated with the selected available game;
- evaluating the prediction with the received results;
- awarding credits based on the evaluation;
- receiving a request to enter a credit accumulation mode;
- activating a sensor listener interface for the one or more sensors;
- determining a periodic interval value indicating a frequency for which the sensor data is requested;
- requesting sensor data after each consecutive elapse of the periodic interval value until the motion ends;
- receiving the sensor data on a motion of one or more sensors of a device;
- determining a performance evaluation based on the received sensor data; and
- awarding credits based on the performance evaluation.

5. The method of claim 4, wherein awarding credits based on the evaluation includes:
- awarding credits in an amount equal to a first multiple of the number of credits for a first prediction type, or awarding credits in an amount equal to a second multiple of the number of credits greater than the first multiple for a second prediction type.

6. The method of claim 4, wherein the prediction is a first prediction for a first discrete event of the one or more discrete events, the method further comprising:
- receiving a second prediction for a second discrete event of the one or more discrete events;
- evaluating the method prediction; and
- awarding credits based on the evaluation of the second prediction.

7. A non-transitory machine-readable medium including instructions stored therein, which when executed by a machine, cause the machine to perform operations comprising:
- presenting, using a graphical display of a computing device, a menu of available live sports games;
- receiving, via an input device of the computer device, a selection of an available game from the available live sports games;
- receiving a prediction for each of one or more discrete events associated with the selected available game;
- receiving a number of credits associated with the prediction;
- receiving live results for each of the one or more discrete events associated with the selected available game;
- evaluating the prediction with the received results;
- awarding credits based on the evaluation;
- receiving a request to enter a credit accumulation mode;
- activating a sensor listener interface for the one or more sensors;
- determining a periodic interval value indicating a frequency for which the sensor data is requested;
- requesting sensor data after each consecutive elapse of the periodic interval value until the motion ends;
- receiving the sensor data on a motion of one or more sensors of a device;
- determining a performance evaluation based on the received sensor data; and
- awarding credits based on the performance evaluation.

8. The machine-readable medium of claim 7, wherein awarding credits based on the evaluation includes:
- awarding credits in an amount equal to a first multiple of the number of credits for a first prediction type, or awarding credits in an amount equal to a second multiple of the number of credits greater than the first multiple for a second prediction type.

9. The machine-readable medium of claim 7, wherein the prediction is a first prediction for a first discrete event of the one or more discrete events, the operations comprising:
- receiving a second prediction for a second discrete event of the one or more discrete events;
- evaluating the second prediction; and
- awarding credits based on the evaluation of the second prediction.

* * * * *